Inventor:
Erwin R. Summers,
by Vernon H. Kalb
His Attorney.

May 27, 1958   E. R. SUMMERS   2,836,779
REGULATING MACHINES FOR CONTROLLING THE
SPEED OF INDUCTION MOTORS
Filed April 18, 1956   2 Sheets-Sheet 2
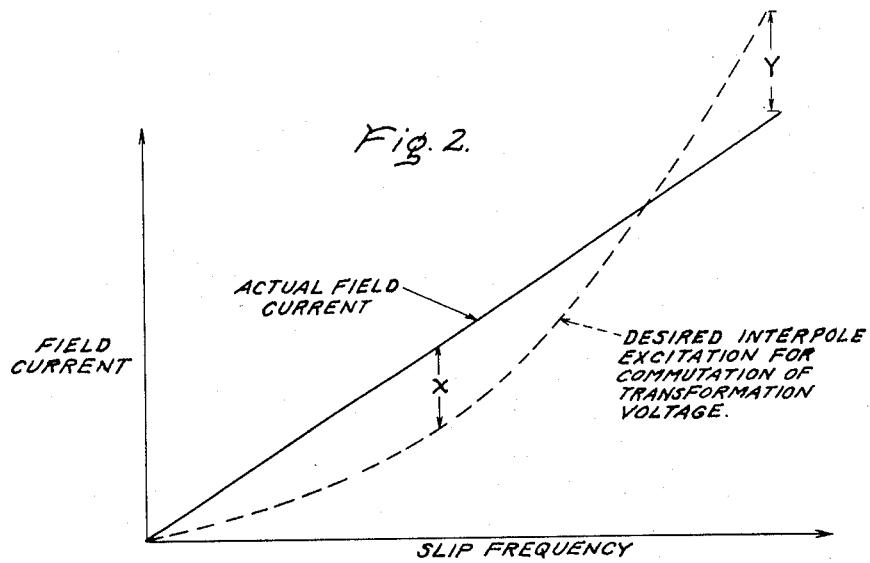
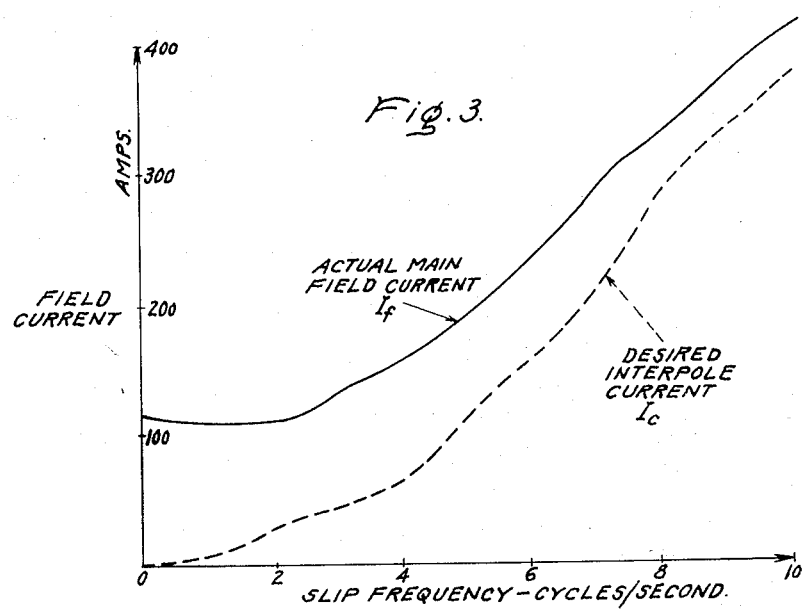
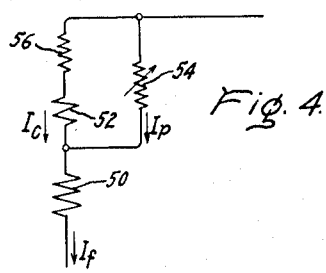
Inventor:
Erwin R. Summers,
by Vernon F. Kalb
His Attorney.

United States Patent Office 2,836,779
Patented May 27, 1958

2,836,779

REGULATING MACHINES FOR CONTROLLING THE SPEED OF INDUCTION MOTORS

Erwin R. Summers, Scotia, N. Y., assignor to General Electric Company, a corporation of New York Application April 18, 1956, Serial No. 578,974

6 Claims. (Cl. 318—197)

The invention described herein relates to the use of auxiliary machines for varying the speed of an induction motor and more particularly to a combined arrangement of Scherbius speed control and Clymer drive for smoothly carrying an induction motor through synchronism and in obtaining efficient operation thereof at higher than synchronous speeds. The primary object of the invention is to provide improved operation of a system of machines connected in a manner to control the speed of an induction motor, the machine system being designed in a manner to return slip energy to the main voltage supply system when the motor is operating below synchronism and to take slip energy from the voltage supply system when the motor is caused to operate above synchronous speeds. Another equally important object of the invention is to provide an improved interpole field circuit in a regulating machine in the machine system for increasing the permissible kva. per pole and for extending the maximum range of slip frequencies by proper adjustment of its pattern of interpole excitation which heretofore caused poor commutation in the regulating machine.

The prior art discloses many different methods for controlling the speed of an induction motor and where the motor is of large size, separate or auxiliary machines are connected to the slip rings of the motor, which is of the wound rotor type, to transform the slip frequency power into another useful form. Two different systems used for this purpose are commonly known as Scherbius speed control and Clymer drive. The Scherbius speed control or drive, in its simplest form, consists of an independent synchronous or induction machine which is driven by or drives a commutator-type regulating machine whose commutator is fed from or delivers energy at slip frequency to main induction motor slip rings, depending on whether the main motor is running below or above synchronous speed. Excitation for the stator of the regulating machine is also provided from the main motor slip rings, usually through a field control transformer, or from an ohmic drop exciter, or a combination of these two types of electrical apparatus. Below synchronism, the regulating machine operates as an A.-C. shunt motor, giving the power represented by the main motor slip back to the line through the synchonous machine acting as a generator. Above synchronism, the direction of slip energy power flow is reversed. This provides either a constant or variable torque drive for the main induction motor.

In another version of Scherbius speed control the synchronous motor may be dispensed with completely and a small ohmic drop exciter or frequency converter added which is driven by the main motor to provide excitation for the regulating machine which is also mechanically coupled to the main induction motor. The slip frequency power is then converted to mechanical power on the main motor shaft and the main motor may then be operated either above or below synchronism. However, as hereinafter discussed, the regulating machine is not always capable of properly commutating its transformation voltage and the induction motor rotor slip frequency currents, and in the past, this has constituted a limiting factor in the design and application of Scherbius regulating machines. This invention reduces or eliminates the above-noted deficiency.

The Clymer drive utilizes a synchronous machine to absorb slip frequency power. The synchronous machine is electrically connected to slip rings on the induction motor rotor and drives a D.-C. generator, which in turn provides power for a D.-C. synchronous motor-generator set that returns power to the lines. This system alone can operate only below synchronous speed of the induction motor.

In carrying out my invention, I more completely utilize the advantageous features of each of the Scherbius speed control and Clymer drive when they are combined into an operable unit to obtain operation thereof on both sides of synchronism and through a large range of frequencies. The commutation difficulties inherent in the Scherbius speed control heretofore described, are alleviated by providing an adjustable shunt resistance and a fixed series resistance in the interpole field circuit of a Scherbius regulating machine, the adjustable shunt resistance being varied in a manner so that it has the correct adjustment at all times with respect to the slip frequency currents and voltages.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawings in which:

Figure 2 is a graph of field current versus slip frequency showing relative values of current flow in field coils of a prior art regulating machine;

Figure 3 is a graph similar to that shown in Figure 2 except that the main and interpole field currents shown, depict their relationship in the regulating machine in this invention; and Figure 4 shows an arrangement of resistors in the interpole circuit of a regulating machine for improving commutation.

Figure 1:
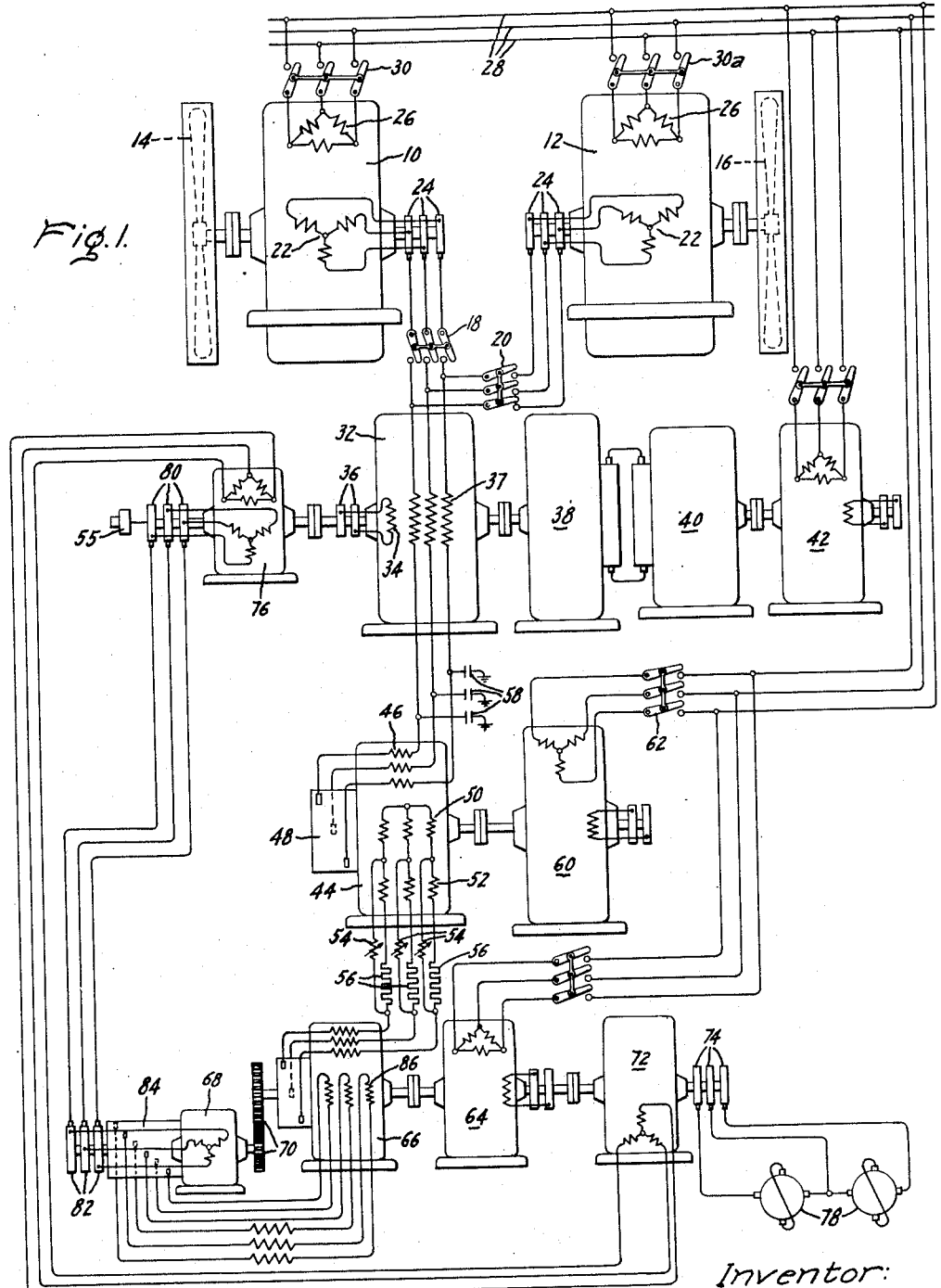
Figure 1 is a schematic view of an electrical system for controlling the speed of an induction motor.

Referring now to the drawings wherein like reference characters designate like or corresponding parts throughout the several views, there is shown a pair of induction motors 10 and 12 of 20,000 H. P. and 22,500 H. P., respectively connected with fans 14 and 16 of a size capable for use in testing model airplanes in wind tunnels. In order to provide air velocities of a sufficient magnitude to effectively carry out the testing of modern aircraft, it is evident that fans 14 and 16 must be capable of supplying air currents over a wide range of velocity, and where a particular velocity is selected, the fan must be capable of maintaining it constant for specified periods of time. In so doing, the fan connected motor must satisfy the requirements of the fan.

This invention makes possible the better fulfillment of such requirements by utilizing two wound rotor induction motors arranged in a manner so that either one or the other may selectively be used in supplying air to its respective tunnel. Contactors 18 and 30, and 20 and 30a, are respectively provided for obtaining individual operation of each motor.

The rotor winding 22 of the induction motors is connected in Y with the lead extending from each leg of the Y terminating in slip rings 24 mounted on the rotor shaft. The field winding 26 is delta-connected as shown, and is supplied with voltage from 60 cycle power lines 28 through contactors 30 and 30a positioned therebetween.

An 11,500 H. P. synchronous machine 32 having its rotor winding 34 excited through slip rings 36 from a D.-C. source, not shown, has its stator windings 37 connected with each of the contactors 18 and 20. The functions of the synchronous machine are to act as a generator and supply voltage of correct magnitude, frequency and phase angle to the stationary rotor winding 22 to establish an induced voltage in stator winding 26 such that switch 30 can be closed without current inrush when starting the induction motor, and to act as a motor in absorbing the slip frequency energy of the induction motor when it is running below synchronous speed for returning such energy to the line 28; and also to act as a generator to supply slip energy to the main induction motor rotor when the latter is running above synchronous speed.

In order to carry out these functions, a Clymer drive of the type generally discussed above, is connected between the collector rings of the induction motor rotor and the voltage supply lines 28. The Clymer drive consists of a variable speed set of machines comprising the synchronous machine 32 directly shafted to a 2400 kw. D.-C. machine 38 which is arranged to operate either as a motor or generator, depending on whether the synchronous machine is performing a generator or motor function; and a constant speed set comprising a 3000 H. P. D.-C. machine 40 connected electrically with machine 38 and mechanically joined with a second synchronous machine 42 of 2700 kva. capacity, also arranged to operate for either direction of power flow.

In starting one of the induction motors, say motor 10, contactors 18 and 58 are closed and machine 42 energized from the A.-C. line 28 to cause operation in a well known manner. The rotation of the synchronous machine armature causes the D.-C. machine 40 to generate a voltage which is conducted to machine 38 for obtaining operation thereof as a motor. As the machine 38 rotates, it causes the synchronous machine 32 to generate a voltage of the proper magnitude and frequency for application to the stationary rotor of the induction motor 10. Because of the large size of the induction motor, it is evident that to close contactors 30 prior to energizing the rotor would cause an excessive transient current that would be several times the normal current for which the machine is designed. To avoid such surges, the voltage on the rotor is built up gradually to a value and frequency corresponding to that appearing in the main voltage supply lines 28 and when it is of the proper phase relationship, the contactors 30 are closed without causing any abnormal current flow or stress in the machine.

Physical rotation of the induction motor rotor is then obtained by slowly decreasing the speed of synchronous machine 32 and thereby decreasing the frequency of current flowing through the rotor with speed of induction motor being proportional to the difference in rotor and stator frequencies. The induced voltages in the rotor of motor 10 and the stator of synchronous machine 32 remain in step as the frequency of the latter is changed, with the rotor current and torque being related to the magnitude of the displacement angle between these two voltages. When the speed of the induction motor is increasing, a part of the torque is used for acceleration, but for a steady state condition, the displacement angle and rotor current correspond directly to the shaft torque of the fan load. In the manner described above, the speed of machine 32 can be decreased and that of motor 10 correspondingly increased until the rotor slip frequency is reduced from 60 cycles to about 5 cycles below synchronism. To operate at a higher speed of motor 10, contactor 58 is opened, and the Scherbius regulating machine 44, hereinafter described, is energized to prevent the synchronous unit 32 from falling out of step at very low frequencies.

When the induction motor is operating at 5 cycles slip or more below synchronism with contactor 50 closed, the slip frequency power is taken from the motor 10 through slip rings 24 and fed to the synchronous machine 32. The energy thus supplied causes motor action on the part of machine 32 and its speed is dependent on the degree of slip in the induction motor 10. As mentioned above, the synchronous machine 32 and D.-C. machine 38 comprise a variable speed set arranged to cause generation of D.-C. power in the machine 38 comparable with the input to machine 32. This D.-C. voltage is then supplied to the constant speed set comprising machines 40 and 42 for returning energy back into the main voltage supply lines 28. A Clymer drive, when used alone, is of single range and can only operate below synchronous speed of the induction motor 10. In this role, it serves three important functions, namely that of (1) assisting in the starting of the main induction motor 10, thereby eliminating a bulky and expensive network of resistors that would otherwise be necessary in motor starting, (2) absorbing the slip frequency power of motor 10 and returning a substantial portion of it to the main voltage supply system, and (3) improving the stator power factor of motor 10 by supplying excitation reactive kva. to the rotor.

In the motor control system disclosed herein, it was found necessary to obtain operation of induction motor 10 above synchronism in order to increase the output of fan 14 and thereby carry out the airplane testing function in a more effective manner. In accomplishing this, a Scherbius speed control system was combined with the aforementioned Clymer drive for achieving operation in the desired higher air speed range which extends above the speed of sound.

The Scherbius regulating machine 44 is of 1000 kva. capacity and of a type known in the art. The basic principle of the regulating machine is the same as that of a neutralized direct-current machine with separate excitation. The armature and commutator are of the ordinary type of construction used in D.-C. machines and voltage is generated by the rotation of the armature conductors through the field produced by the stator exciter windings. The arrangement of brushes and disposition of windings however differs from that used for D.-C. machines in order to adapt the machine to 3 phase operation. The load current passes through neutralizing windings which are so arranged as to neutralize the effect of the armature reaction and to provide proper interpole excitation. Also, any voltage induced in the armature due to alternations of the field flux is cancelled by an equal and opposite voltage induced in the neutralizing winding so that the terminal voltage is that produced by rotation only. The terminal voltage therefore, is proportional to the rotor speed and flux of the machine. Hence, the frequency and phase of the regulating machine voltage corresponds to the shunt field excitation and the amount of voltage is also proportional to the shunt excitation because the speed is constant.

The Scherbius regulating machine 44 provides a programmed voltage pattern of the proper magnitude and phase angle to the rotor of the induction motor to carry it smoothly through synchronism, and to reverse the direction of rotation of synchronous machine 32, and thereafter achieve operation above synchronism. When the main motor 10 is operating above synchronism, the Scherbius machine 44 and the synchronous machine 32 both operate as generators to supply slip frequency power to the collector rings 24. The regulating machine is provided with compensating windings 46 connected at one end in series with the synchronous machine winding and brushes 24 as shown, and at its other end to the commutator 48 on the machine rotor. Contactors 58 are utilized for isolating the regulating machine 44 when the induction motor is operating at a slip frequency of more than 5 cycles below synchronism. The regulating machine 44 is further provided with a main field winding 50 and and an interpole field winding 52, the latter having a variable shunt resistor 54 and fixed resistors 56 in each leg. As mentioned above in the objects of the invention, the prior art Scherbius regulating machines have not had consistently acceptable commutation over all parts of the speed range, particularly with respect to effects of transformation voltage, and this has been a limiting factor in the design and application of regulating machines. This problem is largely resolved, and the application of Scherbius machines correspondingly extended, by the aforementioned series and shunt resistors and specific treatment thereof is presented hereinafter.

A 1500 H. P. synchronous machine 60 which is connected electrically to the main voltage supply lines 28 is directly shafted to the rotor of regulating machine 44 for imparting rotation thereto upon closing of contactors 62 inserted in the line.

It is again noted that the regulating machine 44 must provide a slip frequency voltage of the proper magnitude and phase angle to the induction motor 10 for achieving operation above synchronism. The arrangement of machines for accomplishing production of such a slip frequency voltage comprise the following:

A four pole synchronous motor 64 of a type similar to synchronous machine 42, but of a smaller size, is directly shafted to a Scherbius sub-exciter 66 which in turn is arranged to rotate an ohmic drop exciter 68 through a gear reduction unit 70. The right side of synchronous machine 64 is directly shafted to a 60 cycle generator 72 having slip rings 74 attached to its rotor. The function of the generator 72 is to supply 60 cycle voltage to a frequency changer 76 which has its rotor directly connected with synchronous machine 32. In order for the generator 72 to provide a 60 cycle voltage to the frequency changer 76, a pair of D.-C. amplidyne exciters 78 are connected to the slip rings 74 for delivery of field excitation to the rotor of the generator which in turn provides the above-mentioned 60 cycle stator voltage.

Since the frequency changer 76 is directly connected with synchronous machine 32, the slip frequencies appearing in the synchronous machine stator are reflected in the frequency changer and operation of the latter is such that the output appearing on collector rings 80 will be in the form of a 60 cycle voltage plus or minus the slip frequency of the induction motor 10, depending on whether operation is above or below synchronism. This voltage is conducted to the slip rings of an ohmic drop exciter 68. To provide adjustable excitation at slip frequency for the regulating machine 44 and thus obtain the voltage which is required for taking the induction motor 10 through synchronism, a 3-phase commutator-type of frequency changing exciter 68 is used. This ohmic drop exciter 68 is provided with an armature similar to that of a rotary converter having both commutator and collector rings. To obtain the desired voltage ratio, the collector rings and commutator are connected to separate windings in the rotor of exciter 68. The field punchings which surround the armature are without slots or windings and serve simply to complete the magnetic circuit of the armature. Since the exciter slip rings 82 are connected to a power source of 60 cycles plus or minus slip frequency of the main motor 10, and the commutator 84 is driven at synchronous speed by motor 64, the voltage of commutator brushes 84 will be at slip frequency, because the mechanical rotation of the rotor of 68 is in a direction opposite to that of the phase sequence of the collector ring winding with respect to the rotor structure.

As shown, the commutator brushes 84 are directly connected with the exciting windings 86 of the Scherbius sub-exciter 66. The sub-exciter 66 operates on the same principle as the regulating machine 44 and is inserted in the circuit only because of the ohmic drop exciter 68 is not of sufficient size to excite directly the larger regulating machine 44. It will be evident that since the same slip frequency of the induction motor is imposed by mechanical rotation on the frequency changer 76, separated by the ohmic drop exciter 68, and fed through the regulating machines 66 and 44, any voltage produced by the regulating machine 44 will be of the same frequency as that appearing in the rotor of induction motor 10. Since the frequencies are the same, and the proper magnitude and phase angle has been supplied to the excitation system by the amplidyne exciters, it will be apparent that the voltage output of the regulating machine 44 will be in step with that appearing on the rotor of the induction motor 10.

To obtain operation of the induction motor 10 above synchronism, the Scherbius sub-exciter 66 and regulating machine 44 both operate as generators and produce voltages having the same frequency as that represented by the slip frequency of induction motor 10. The Clymer drive, comprising machines 42, 40, 38 and 32, at the same time, takes power from the main voltage supply lines 28 to cause the synchronous machine 32 to operate as a generator thereby generating a voltage which has a component that is additive to the voltage of regulating machine 44. This combined voltage is then applied through slip rings 24 to the rotor winding 22 of the induction motor 10. By manipulating the excitation of regulating machine 44 and synchronous machine 32 with a programmed control, their combined generated voltages causes the induction motor rotor to smoothly accelerate, travel through synchronism, and finally settle on a speed corresponding to the selected slip above synchronism and to operate at the desired stator power factor. The selected slip frequency above synchronism is determined by the desired air output of fan 14. When passing thru synchronism, the phase sequence reverses as in all slip frequency circuits, and the mechanical rotation of synchronous machine 32 also reverses.

The commutation difficulties encountered in prior Scherbius regulating machines have been eliminated by the following structure.

In a prior art and conventional adjustable-speed wound-rotor induction-motor drive with Scherbius control, the same current either flows thru both the main field winding and the shunt interpole field winding of the Scherbius unit, or else there is a fixed ratio between these two field currents, such as the turn ratio of a transformer. Since, in a conventional adjustable-speed wound-rotor induction motor drive with Scherbius control, the collector ring voltage of the induction motor and the matching generated voltage of the regulating machine are approximately proportional to the slip frequency, the actual field current of the regulating machine is also approximately proportional to slip frequency, if saturation is neglected, as indicated by the straight line in Figure 2, assuming that the regulating machine is separately driven at constant speed.

However, the transformation voltage in the armature coils being commutated, varies directly with the main pole flux and also with the slip frequency, or as the square of the frequency (when the generated armature voltage is proportional to frequency). Hence the desired shunt excitation of interpoles varies approximately as the square of the frequency as represented by the dotted line of Figure 2, because this component of interpole flux should be proportional to the transformation voltage.

The difference between the "actual" and the "desired" shunt interpole current corresponds to the net or uncompensated portion of the transformation voltage which is imposed on and must be commutated by the brushes. To obtain acceptable performance, the maximum differences at "X" and "Y" must not exceed the commutating ability of the brushes, and this has, for many years, been a basic limitation in the design and application of Scherbius regulating machines. The permissible maximum flux, the maximum kva. per pole, and/or the maximum slip frequency of the regulating unit were restricted because the desired pattern of interpole excitation could not be obtained at all points over the range of operation.

To go thru synchronism smoothly and to maintain stability and prevent oscillation or hunting of the synchronous unit 32 in the above described combination of Clymer and Scherbius systems for wind tunnel drive, a substantial generated voltage and main field current, over 100 amperes, is required in the Scherbius unit near synchronism, as shown in curve $I_f$ of Figure 3. When all of this main field current is passed thru the shunt interpole field coils also, a relatively large interpole flux is established when the transformation voltage is essentially zero, and this unwanted component of interpole flux causes destructive voltage commutation, such that the Scherbius machine, when operated according to prior art, becomes inoperative after a few hours.

Accordingly, to send only the desired portion $I_c$, Figure 4, of the main field current thru the interpole winding, an adjustable shunt resistance 54 and a fixed series resistance 56 were added to the field circuit, and the rheostat 54 was programmed and automatically shifted so that it has the correct adjustment at all times with respect to the slip frequency. There are many known ways of programming and automatically shifting the rheostat. In this embodiment, a tachometer 55 which is mounted on the rotor shaft of frequency changer 76 and generates a voltage signal that is proportional to slip frequency, is connected to a voltage divider or bridge circuit which automatically adjusts the position of the shunt rheostat by pilot motor control to give the desired interpole excitation for each value of slip frequency over the speed range.

For this arrangement to be operative, the currents in the shunt-interpole and main field windings 52 and 50, $I_c$ and $I_f$ respectively, must remain in phase with each other at all slip frequencies; otherwise the rotation voltage produced by the shunt component of the interpole flux would not cancel the transformation voltage of the main field flux, with respect to the armature coil undergoing commutation.

Since the reactance and the induced voltages, from the fluxes of both series and shunt excitation, in the shunt interpole coils change widely with the frequency and also with the load, neither a simple resistance shunt, nor a combination of adjustable resistance and fixed reactance shunt, is acceptable. It is impractical to separately program both a variable reactor and also a variable resistor (in series) as an interpole shunt, because of the changes in interpole flux due to variations in load current thru the compensating winding.

To avoid objectionable differences in phase angle between the parallel currents $I_c$ and $I_p$, the resistance 56 is made approximately 10 times the maximum combined reactance (due to both self and mutual inductance) of the interpole field winding 52. For individual machines the specific resistance-reactance ratio described above will deviate considerably in either direction from the above-mentioned 10:1 ratio depending on operating conditions for which the equipment is designed. Then both the series and shunt paths are essentially "resistance" circuits, and the current $I_c$, $I_p$ and $I_f$ remain very nearly in phase with each other. The "out of phase" or unwanted quadrature component of $I_c$ due to induced voltage in interpole coil, is of the order of only 2% of the total interpole excitation, and is too small a discrepancy to be of serious consequence.

Obviously many modifications and variations are possible in light of the above teachings. For example, specific sizes of the various machines utilized in obtaining speed control of the main induction motor have been recited, but it will be apparent to those skilled in the art that machines of varying size may be used according to the dictates of different speed control systems. The specific machines disclosed herein are used for illustrative purposes only and to teach the principles embodied in the new systems. It is to be understood that within the scope of the appended claims the invention may be practiced otherwise than as specifically described.

What I claim as new and desire to secure by Letters Patent of the United States is:

1. A speed control system for an induction motor comprising means for energizing the stator thereof from a source of voltage supply, a first dynamoelectric machine electrically connected with said induction motor for facilitating starting of the latter and for absorbing slip frequency energy of the motor when it is running below synchronous speed, a second machine having main and interpole field windings and being electrically connected with said first machine and said motor for providing the rotor of the latter with a slip frequency voltage of a magnitude and phase angle for obtaining operation of the motor below, through, and above synchronism, and means connected with said second machine for manipulating the main field and interpole field excitation thereof over a predetermined pattern to obtain said slip frequency voltage through a specified range of speed of the induction motor.

2. A speed control system for an induction motor comprising means for energizing the stator of the motor, a coupled regulating machine and synchronous machine arranged for either motor or generator operation, the regulating machine having main and interpole field windings comprising a field circuit and being electrically connected with the rotor of said motor for absorbing slip frequency power when said motor is operating below synchronism and for providing the motor with a slip frequency voltage of the proper magnitude and phase angle for obtaining operation thereof above synchronism, and a plurality of resistance elements inserted in said field circuit of said regulating machine for obtaining proper transformation voltage commutation, said resistance elements being arranged to provide the correct adjustment of current flow in said field circuit with respect to slip frequency currents in said induction motor.

3. A speed control system for an induction motor of the type having stator and wound rotor windings comprising means for energizing said stator from a source of voltage supply, a first assembly of machines electrically connected between the rotor of said induction motor and said source of voltage supply for respectively obtaining starting of said motor and absorbing slip frequency energy of said motor when it is running below synchronous speed, and delivering slip frequency to said motor when it is running above synchronous speed, said assembly of machines comprising a pair of D.-C. synchronous motor generator sets each adapted to perform a motor or generator function according to whether power is being absorbed from said induction motor when it is operating below synchronism, or whether power is being supplied to the rotor of said induction motor immediately below, at, or above synchronism, and a regulating machine having main and interpole field windings comprising a field circuit and being electrically connected with one of said synchronous machines and the rotor of said induction motor for providing a voltage of the proper magnitude and phase angle to said motor rotor in achieving operation above synchronism, and a fixed series resistance and an adjustable shunt resistance in said field circuit of said regulating machine for adjusting the distribution of flux in said regulating machine necessary for producing and commutating said voltage.

4. A system for controlling the speed of a wound rotor induction motor comprising means for energizing the stator of said motor, a regulating machine having main and interpole field windings comprising a field circuit and being electrically connected with slip rings mounted on a rotor for said induction motor and being arranged to provide a voltage of the proper magnitude and phase angle to the rotor for obtaining operation both below and above synchronism, and means connected with said regulating machine for producing said voltage, said last-named means comprising a generator of a type having a voltage output of adjustable frequency and arranged for connection in said field circuit of said regulating machine thereby providing said regulating machine with a slip frequency voltage necessary for obtaining operation of said induction motor above synchronism, and means for adjusting current flow through said interpole winding, said last-named means comprising a fixed and adjustable resistor in the interpole field winding circuit of the regulating machine for obtaining proper commutation of transformation voltage.

5. A device for improving the commutation and for extending the maximum range of slip frequency and increasing the permissible kva. per pole of a regulating machine used for generating a range of voltages and frequencies and for controlling the speed of an induction motor comprising, a main field winding in said machine, a fixed series resistance and an adjustable shunt resistance connected in parallel in an interpole field winding for said machine, the ohms of said fixed series resistance being greater than the ohms of the maximum reactance of said interpole field winding to limit and control the phase shift of the current in the interpole winding with respect to that of the main field winding, and means connected with said fixed series resistance and adjustable shunt resistance for providing the correct adjustment of current flowing in said interpole field winding with respect to each value of slip frequency over the speed range of said motor to obtain proper commutation of transformation voltage throughout the range of slip frequency over which operation occurs.

6. A speed control system for an induction motor of the type having stator and wound rotor windings comprising means for energizing said stator from a source of voltage supply, a first assembly of machines electrically connected between the rotor of said induction motor and said source of voltage supply for respectively obtaining starting of said motor and absorbing slip frequency energy of said motor when it is running below synchronous speed, and delivering slip frequency to said motor when it is running above synchronous speed, said assembly of machines comprising a pair of D.-C. synchronous motor generator sets each adapted to perform a motor or generator function according to whether power is being absorbed from said induction motor when it is operating below synchronism, or whether power is being supplied to the rotor of said induction motor immediately below, at, or above synchronism, and a regulating machine having main and interpole field windings and having its output electrically connected with one of said synchronous machines and the rotor of said induction motor for providing a voltage of the proper magnitude and phase angle to said motor rotor in achieving operation above synchronism, and a fixed series resistance and an adjustable shunt resistance connected in parallel with said interpole field winding of said regulating machine for adjusting the distribution of flux in said regulating machine necessary for producing and commutating said voltage, and means for providing excitation to said regulating machine, said last-named means comprising D.-C. amplidyne exciters arranged with and electrically connected to an A.-C. generator for providing a 60 cycle voltage of a predetermined magnitude and phase angle to a frequency converter electrically connected therewith and mechanically driven at slip frequency such that its collector ring output is 60 cycles plus or minus slip frequency depending on whether said induction motor is operating above or below synchronism, and an ohmic drop exciter electrically connected with said frequency changer for converting the output of the latter to slip frequency for exciting the field circuit of said regulating machine.

References Cited in the file of this patent

UNITED STATES PATENTS

| | | |
|---|---|---|
| 1,778,599 | Hull et al. | Oct. 14, 1930 |
| 1,853,004 | Jump | Apr. 5, 1932 |
| 2,295,336 | Clymer | Sept. 8, 1942 |